United States Patent [19]

Mackal

[11] Patent Number: 5,425,397
[45] Date of Patent: Jun. 20, 1995

[54] IN LINE ORAL INFLATION VALVE

[76] Inventor: Glenn H. Mackal, 2586 25th Ave. North, St. Petersburg, Fla. 33713

[21] Appl. No.: 252,720

[22] Filed: Jun. 2, 1994

[51] Int. Cl.⁶ .............................................. F16K 21/04
[52] U.S. Cl. .............................. 137/540; 137/543.13; 251/86
[58] Field of Search ....................... 137/540, 543.13; 251/86

[56] References Cited

U.S. PATENT DOCUMENTS

| | | | |
|---|---|---|---|
| 674,674 | 5/1901 | Fernald | 251/86 |
| 2,264,656 | 12/1941 | Briscoe et al. | 251/86 |
| 2,750,958 | 6/1956 | Baker et al. | 137/543.13 |
| 3,396,743 | 8/1968 | Mackal et al. | 251/86 |

FOREIGN PATENT DOCUMENTS 988791  8/1951  France .................. 137/543.13

*Primary Examiner*—A. Michael Chambers
*Attorney, Agent, or Firm*—Joseph C. Mason, Jr.; Ronald E. Smith

[57] ABSTRACT

A check valve has a point-to-point articulated connection between its valve stem and valve head so that the head is free to skew when unseated. The valve head is positioned within the interior of the valve body between a valve seat and the trailing end of the valve body and retracts further into the valve body when unseated by the introduction of gaseous fluid into the valve body. The leading end of the valve stem is cone-shaped, and is received within a cone-shaped recess formed in the trailing end of the valve head. A bias member urges the valve stem toward the valve head so that the vertex of the cone-shaped valve stem is in point-to-point contact with the vertex of the cone-shaped recess. When gaseous fluid is introduced into the valve body, the valve head unseats from the valve seat and is free to skew with respect to its seated orientation, but since it retracts into the valve body, the inner sidewalls of the valve body prevent excessive skewing. A spear formed integrally with the valve head extends through a central opening formed in the valve seat and also prevents excessive skewing.

6 Claims, 1 Drawing Sheet

# IN LINE ORAL INFLATION VALVE

BACKGROUND OF THE INVENTION

1. Field of the Invention

This invention relates to check valves. More particularly, it relates to an oral inflation valve having an improved articulated connection between the valve stem and the valve head.

2. Description of the Prior Art

U.S. Pat. No. 5,135,025 to the present inventor represents the most pertinent prior art to the subject disclosure. That disclosure describes an oral inflation valve where a ball is formed at the leading end of a valve stem and where a socket for rotatably receiving the ball is formed in the valve head. The valve head skews when unseated by air passing through the valve, but the articulated connection between the head and valve stem ensures that the head will seat properly when the valve returns to its repose configuration under the influence of a bias means upon cessation of air flow therethrough.

In a second embodiment of the earlier device, a frustoconical member replaces the ball at the leading end of the valve stem, but the structure of the second embodiment is otherwise the same as the first.

Although both embodiments work well, it has been noted that the friction between the ball and socket tends to hold the valve head in a skewed position; the tension of the bias means employed to pull the valve head to its seated position must therefore be strong enough to overcome such friction. Moreover, it has been noted that the valve head, when unseated by air flowing therethrough, is extended from the valve body. In other words, when in repose the valve head is positioned at the distal end of the valve body, but when unseated it extends therefrom. Thus, the amount of skewing that may occur is quite high because the valve body provides no limitation thereto.

It has thus been perceived that the earlier device could be improved by eliminating the ball and socket connection between the valve head and valve stem, and by positioning the valve head within the valve body so that the body could serve to limit the amount skewing of the valve head when unseated from its seat by the passage of air through the valve body. However, this perception is part of the inventive process, and neither said perception nor the way to achieve the beneficial results of a design not subject to the limitations of the earlier design were apparent to those ordinary skill in this art at the time the present invention was made, in view of the prior art when considered as a whole at said time.

SUMMARY OF THE INVENTION

The novel check valve of this invention includes a generally cylindrical, elongate valve body having an open leading end into which a gaseous fluid is admitted and an open trailing end from which gaseous fluid is exhausted, a radially inwardly extending valve seat formed in said valve body, said valve seat being disposed a predetermined distance from said open leading end, a valve head having a leading end adapted for seating against said valve seat, said valve head being disposed between said valve seat and said trailing end of said valve body, said valve seat having a central opening formed therein, an elongate skew-limiting member integrally formed with said valve head on a leading side thereof and extending therefrom through said central opening, a cone-shaped recess formed in a trailing side of said valve head, a valve stem having a cone-shaped leading end, and a bias means for urging said valve stem in a trailing-to-leading direction so that said cone-shaped leading end of said valve stem is held into position within said cone-shaped recess formed in said valve head, whereby a point of said valve seem leading end is urged by said bias means into point-to-point contact with a point at the vertex of said cone-shaped recess so that the connection between said valve stem leading end and said valve head is articulated and relatively free of friction, and whereby said valve head, when unseated by gaseous fluid flow through said valve body, is constrained against skewing to a predetermined extent by said valve body.

The primary object of this invention is thus understood to be the advancement of the art of check valves in general and oral inflation valves in particular.

A more specific object is to provide a self-seating, articulated valve head construction having the lowest possible amount of friction between the valve stem and the valve head.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
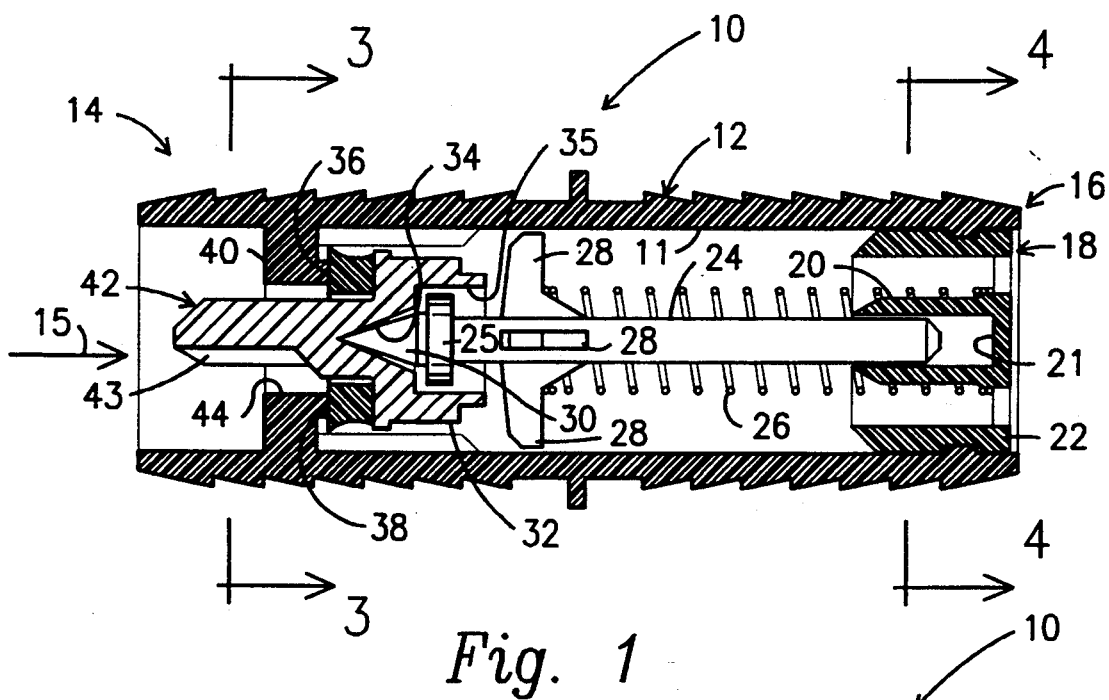
FIG. 1 is a longitudinal sectional view of an illustrative embodiment of the invention when in repose.
Figure 2:
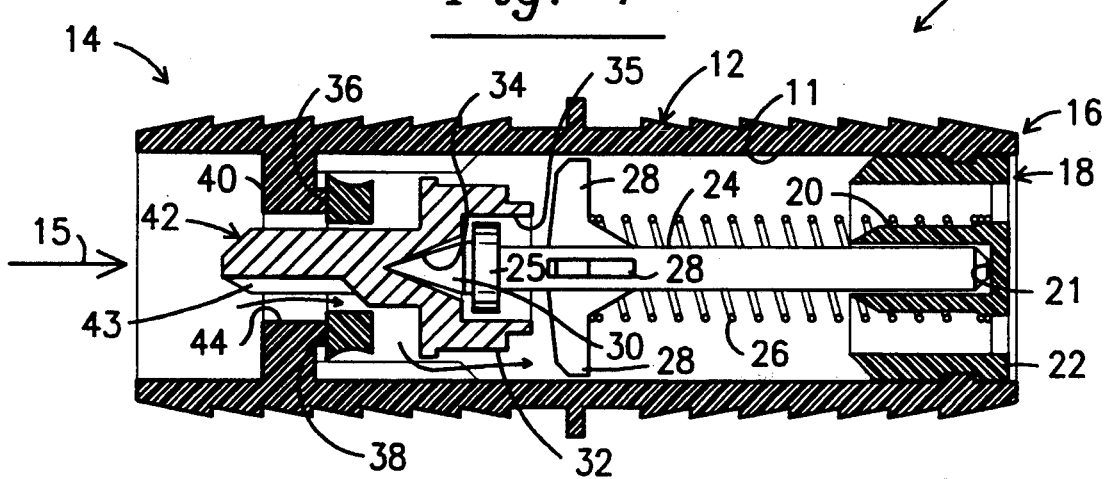
FIG. 2 is a view like that of FIG. 1, but depicting the novel device when air has unseated the valve head from the valve seat.

Referring now to FIGS. 1 and 2, it will there be seen that an illustrative embodiment of the invention is denoted as a whole by the reference numeral 10.

Check valve 10 is primarily intended for use as an oral inflation valve, but it has utility as a general use check valve for any gaseous fluid.

Valve 10 includes elongate, generally cylindrical valve body 12 having an open leading end 14 and an open trailing end 16.

Figure 4:
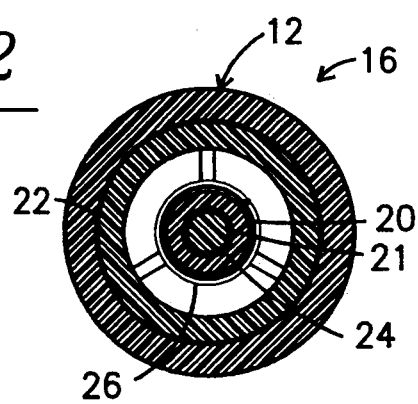
FIG. 4 is a transverse sectional view taken along line 4—4 in FIG. 1.

A bias means support and valve stem guide member, also known as a spider, is secured within valve body 12 at the trailing end thereof and is denoted 18 as a whole. In a preferred construction, as perhaps best understood in connection with the transverse sectional view of FIG. 4, member 18 includes a cylindrical central hub 20 and a plurality of radially extending arms, collectively denoted 22, that interconnect hub 20 and valve body 12.

Valve stem 24 has a trailing end slideably received within cylindrical hub 20 as depicted in FIGS. 1 and 2.

Bias means 26 has a trailing end that abuts radial arms 22 and which ensleeves cylindrical hub 20. Hub 20 thus serves to center bias means 26 and valve stem 24 with respect to the longitudinal axis of symmetry of valve body 12. Valve 10 is therefore known commercially as in inline check valve.

In FIG. 1, valve stem 24 is in its position of repose. Note the amount of clearance between its trailing end and bottom wall 21 of central hub 20; said bottom wall limits the extent of the valve stem's travel when gaseous fluid is admitted into valve 10.

A plurality of radially extending wings, collectively denoted 28, are formed integrally with valve stem 24 near its leading end and serve to limit skewing of said stem. The spacing between the radially outermost edge of the respective wings and the cylindrical inner sidewall 11 of valve body 12 determines the amount of skewing that may occur when said valve stem is displaced toward the trailing end of said valve upon flow of gaseous fluid therethrough.

The leading end of stem 24 has a cone-shaped construction and is denoted 30.

The valve head is denoted 32. It has a conical recess 34 formed therein for receiving cone-shaped leading end 30 of stem 24. The diameter of the base of recess 34 is greater than the diameter of the base of leading end 30, and the cone angle of recess 34 is greater than the cone angle of leading end 30 so that valve head 32 is free to skew with respect to valve stem 24 when unseated. In other words, the only contact between leading end 30 and recess 34 is a point-to-point contact as depicted in FIG. 1 when said parts are in their respective positions of repose. The difference between the included angles of the recess 34 and leading end 30 limits the total skew.

A cylindrically-shaped recess 35 is formed in the trailing end of valve head 32 as shown; said cylindrically-shaped recess is in open communication with cone-shaped recess 34.

An annular ring 25 is formed on valve stem 24, said annular ring being positioned in trailing relation to cone-shaped leading end 30 of valve stem 24 and being positioned within said cylindrically-shaped recess 35.

Wings 28 are positioned outside cylindrical recess 35, in trailing relation thereto, and said wings have a collective radial extent slightly less than an inner diameter of valve body 12. Accordingly, it should be clear that annular ring 25 cooperates with wings 28 to limit the skewing of valve stem 24.

Valve head 32 has an annular, flat leading end 36 that is seated flatly against annular, flat valve seat 38 when the valve is in repose, i.e., when no gaseous fluids are passing therethrough. Valve seat 38 is formed on the trailing side of a radially inwardly extending seat base 40 as shown, said seat base 40 being formed integrally with valve body 12.

Figure 3:
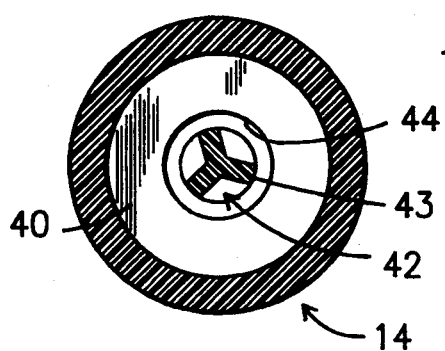
FIG. 3 is a transverse sectional view taken along line 3—3 in FIG. 1.

Valve head 32 further includes an integrally formed spear 42 that projects through central opening 44 defined by the radially innermost ends of seat base 40. Spear 42 is fluted as shown in FIG. 3, i.e., it includes a plurality of radially extending fins 43 formed therein. The length of spear 42 is predetermined and is greater than the distance separating the trailing end of valve stem 24 and bottom floor 21 of cylindrical hub 20 so that when bias means 26 is compressed by the flow of gaseous fluid entering valve body 10 as indicated by directional arrow 15, the leading end of spear 42 will still be within said central opening 44 when the trailing end of valve stem 24 abuts bottom wall 21. This ensures against over-skewing of valve head 32 with respect to cone 30.

Over-skewing of said valve head 32 is also prevented because it advantageously remains within valve body 12 when unseated, as depicted in FIG. 2. Moreover, valve head 32 need not be mechanically retained because it is trapped within valve body 12, i.e., it cannot be blown out.

The vertex of valve head recess 34, the vertex of valve stem leading end 30, and a longitudinal axis of symmetry of the valve head, the spear, the valve stem, and the cylindrical hub are in axial alignment with one another and with a longitudinal axis of symmetry of the valve body. Thus, all of the parts of the device are inline with one another. This creates an inherent instability in the device at the point-to-point contact between the valve stem and the valve head, thereby assuring skewing of the valve head as desired upon fluid flow through the device.

This invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A check valve, comprising:
   a generally cylindrical, elongate valve body having an open leading end into which a gaseous fluid is admitted and an open trailing end from which gaseous fluid is exhausted;
   a radially inwardly extending valve seat formed in said valve body, said valve seat being disposed a predetermined distance from said open leading end;
   a valve head having a leading fend adapted for seating against said valve seat, said valve head being disposed between said valve seat and said trailing end of said valve body;
   said valve seat having a central opening formed therein;
   a cone-shaped recess formed in a trailing end of said valve head;
   a cylindrically-shaped recess formed in said trailing end of said valve head, said cylindrically-shaped recess being in open communication with said cone-shaped recess;
   a valve stem having a cone-shaped leading end;
   an annular ring formed on said valve stem, said annular ring being positioned in trailing relation to said cone-shaped leading end and being positioned within said cylindrically-shaped recess;
   a plurality of radially-extending wings formed on said valve stem in trailing relation to said annular ring, said wings being positioned outside said cylindrical recess, and said wings having a collective radial extent slightly less than an inner diameter of said valve body;

a bias means for urging said valve stem toward said valve seat so that said cone-shaped leading end of said valve stem is urged into said cone-shaped recess;

whereby a vertex of said cone-shaped valve stem leading end is urged by said bias means into point-to-point contact with a vertex of said cone-shaped recess so that the connection between said valve stem leading end and said valve head is articulated and substantially free of friction; and whereby said valve head, when unseated by gaseous fluid flow through said valve body, is constrained against skewing to a predetermined extent by said annular ring and said wings.

2. The valve of claim 1, further comprising:

an elongate spear member integrally formed with said valve head on a leading side thereof and extending therefrom through said central opening formed in said valve seat.

3. The valve of claim 2, further comprising a spider member secured within said valve body at its trailing end, said spider member having a cylindrical central hub and a plurality of radially extending arms disposed in interconnecting relation to said central hub and said valve body.

4. The valve of claim 3, wherein a trailing end of said valve stem is slideably received within said cylindrical hub of said spider member.

5. The valve of claim 4, wherein a trailing end of said bias means is supported by said radially extending arms of said spider member, and wherein said trailing end of said bias means ensleeves said cylindrical hub.

6. The valve of claim 5, wherein said vertex of said valve head recess, said vertex of said valve stem, and a longitudinal axis of symmetry of said valve head and valve stem are in axial alignment with one another and with a longitudinal axis of symmetry of said valve body.

* * * * *